United States Patent
Seddon et al.

[11] Patent Number: 5,352,388
[45] Date of Patent: Oct. 4, 1994

[54] NON-LINEAR OPTICAL DEVICE

[75] Inventors: Kenneth R. Seddon; Christer B. Aakeroy, both of West Sussex; Nicholas Blagden, Merseyside; Yasmin Patell, Kent, all of England

[73] Assignee: The Secretary of State for Defence in Her Britannic Majesty's Government of the United Kingdom of Great Britain and Northern Ireland, London, England

[21] Appl. No.: 965,379
[22] PCT Filed: Apr. 19, 1991
[86] PCT No.: PCT/GB91/00616
  § 371 Date: Dec. 17, 1992
  § 102(e) Date: Dec. 17, 1992
[87] PCT Pub. No.: WO91/16657
  PCT Pub. Date: Oct. 31, 1991

[30] Foreign Application Priority Data
  Apr. 20, 1990 [GB] United Kingdom ............... 9008878.2

[51] Int. Cl.$^5$ ................................. F21V 9/00
[52] U.S. Cl. .................................. 252/582; 252/587; 359/328
[58] Field of Search ................. 359/328, 329; 252/582, 252/587, 600, 589

[56] References Cited

U.S. PATENT DOCUMENTS 5,196,147 3/1993 Taketani et al. ..................... 252/582

FOREIGN PATENT DOCUMENTS

| 0031282 | 7/1981 | European Pat. Off. . |
| 1-201630 | 8/1989 | Japan . |
| 2-73236 | 3/1990 | Japan . |
| 2-73237 | 3/1990 | Japan . |
| 2-77025 | 3/1990 | Japan . |

Primary Examiner—Philip Tucker
Attorney, Agent, or Firm—Nixon & Vanderhye

[57] ABSTRACT

A non-linear optical device comprises a crystalline, second harmonic generator material mounted in the optical path of a laser, in which the crystalline material consists of a slat of a chiral carboxylic acid and an organic nitrogenous base which has a noncentrosymmetric crystal structure.

10 Claims, 1 Drawing Sheet

NON-LINEAR OPTICAL DEVICE

This invention relates to non-linear optical (NLO) devices incorporating second harmonic generator materials which produce a second harmonic generation (SHG) of optical wavelength electromagnetic radiation, in particular laser radiation.

It is known that various organic and inorganic compounds possess the ability to double the frequency of laser light passing through them. This ability is known as second harmonic generation (SHG) and is particularly significant because it provides the ability to produce laser light of higher energy than that provided by the initial laser light source.

Known inorganic compounds which possess SHG properties include alpha-silica, potassium dihydrogenphosphate (KDP), zinc blende wurtzite, and gadolinium and terbidium molybdates. Known organic compounds which possess SHG properties include urea, cadmiumthiourea complexes, L-argininium dihydrogen phosphate monohydrate (LAP), some siloxane and silicone polymeric liquid crystals, stilbene-containing liquid crystals, some silver containing emulsions, dipotassium tartrate hemihydrate, potassium sodium tartrate tetrahydrate, compounds having large secondary molecular susceptibilities (beta-values) such as 4-(N-pyrrolidino)-3-(N-ethanamido)-nitrobenzene (PAN) and 4-(dimethylamino)-3-(N-ethanamido)-nitrobenzene (DAN), and blends of large beta-value compounds with polypeptides as disclosed in European Patent Application Number EP-0338702-A1.

Within the field of known SHG materials, crystalline materials form an important class because many can be grown from solution into large, transparent single crystals of good optical quality. However, ideally a crystalline SHG material must possess a combination of desirable properties to be practically useful for incorporation in an NLO device. Amongst the most important of these properties are:

(1) High solubility in organic and/or aqueous media in order to promote a reasonable rate of crystal growth from solution.

(2) Good crystal growth properties.

(3) High thermal stability, in particular high melting point, to facilitate the (normally high temperature) incorporation of the materials into NLO devices and to provide adequate resistance to thermal damage in the presence of laser radiation.

(4) Good mechanical strength.

(5) lack of colour, in order to promote high optical transmissivity at all optical wavelengths and low heat absorption of laser energy.

(6) Absence of hygroscopy.

(7) Ability to form hydrate-free crystals, since prolonged heating of a hydrated crystalline material by laser radiation may promote the liberation of water vapour and so degrade the structure of the material from within.

(8) High SHG response chracteristics.

(9) Low cost of production.

Very few crystalline materials possess a sufficient number of these properties to render them useful in practical NLO devices. The principle disadvantage of known crystalline inorganic compounds exhibiting SHG response is their generally low threshold to optical damage which leaves them vulnerable to damage by laser light. The principle disadvantages of known crystalline organic compounds exhibiting SHG response is their generally high cost of production, and their generally poor crystal strength and high volatility which results in mechanical damage and dissipation of the materials. Any material damage results in a reduction of power in the light emitted from NLO devices employing the material, and also results in the material absorbing excessive amounts of heat which can cause further damage to the material. For example, although KDP and LAP are currently widely used in NLO devices, KDP is hygroscopic, and LAP is both hydrated and possesses a melting point of only 140° C., and neither exhibits an SHG response of high magnitude.

It is an object of the present invention to provide materials for use in NLO devices which are capable of providing an SHG response whereby the aforementioned disadvantages are reduced to more acceptable levels. It is a further object of the present invention to provide effective SHG responsive materials which are cheaper than the known SHG responsive materials of comparable efficacy.

The present invention thus provides an NLO device comprising a cystalline SHG material mounted in the optical path of a laser, wherein the crystalline material comprises a salt of an organic nitrogenous base and a carboxylic acid, said acid containing, in addition to its carboxylic (—COOH) group, at least one substituent group selected from —OH and —COOH, said the crystalline salt having a non-centrosymmetric crystal structure.

The principal advantages of using the present organic salts in an NLO device is that they they generally possess good crystal-growing properties and grow crystals of good optical quality, the crystals are generally colourless, they possess relatively high melting points, and they can be prepared from a wide variety of readily available and relatively inexpensive starting materials (acids and bases).

Conveniently, one or both of the acid or base molecules possesses one or more chiral centres and the salt comprises only optically resolved forms, i.e., either an L- or a D- form of the acid or base is used, racemates or meso-forms not having the desired capacity to ensure a non-centrosymmetric crystalline structure. Use of such optically pure enantiomers to prepare the salt crystals will ensure the formation of a non-centrosymmetric crystalline structure. It should be noted, however, that the use of optically active acids and/or bases is not a necessity for achievement of the required structure as will be demonstrated in the examples below. The presence of the required non-centrosymmetric structure may be ascertained by X-ray crystallography or, more conveniently, by detecting (either visually or by the method described by Kurtz and Perry. *J. Appl. Phys.*, 1968, 39, 3798) the presence of a frequency-doubling response in powdered samples of material subjected to incident infra-red laser light.

The magnitude of the SHG response is influenced by the fixed alignment of the ions in the crystal and is favoured by bonding interactions that will influence the overall crystal geometry of the target material. Hydrogen bonding is found to enhance the probability of generating a non-centrosymmetric crystalline structure and so acids and/or bases which contain hydrogen bond-promoting donors and acceptors are preferred. The facilitative effect of ordered crystalline structure is a feature of both chiral and non-chiral salts used in the present device.

The organic carboxylic acid contains one or more substituent groups which promote hydrogen bonding with the base. These additional groups are independently selected from hydroxyl (—OH) and carboxyl (—COOH) groups, and their number per acid molecule is preferably from 1 to 4, more preferably from 1 to 3. In addition to the advantages stated above, hydrogen bonding tends to increase the thermal stability and mechanical strength of the crystalline material, and to suppress the formation of crystalline hydrates.

It has been found that the magnitude of the SHG response tends to decrease with increasing molecular weight of the acid. The molecular weight of the acid is therefore preferably less than 100x, where x is an integer equal to the total number of hydroxyl (—OH) and carboxyl (—COOH) groups present in the acid molecule.

Preferred amongst organic carboxylic acids are enantiomerically pure optically active enantiomers of chiral acids containing hydrogen bond-promoting substituent groups. Such hydrogen bonding promoting groups are preferably selected from —OH and —COOH. These acids are preferably enantiomerically pure. Examples of such preferred acids include optically pure L- or D- enantiomers of lactic acid, malic acid, succinic acid, tartaric acid, cinnamic acid, citraconic acid, glutaconic acid, fumaric acid, maleic acid. Especially preferred salts of acids from within this preferred class of chiral acids comprise L-or D-hydrogen tartrates, for example L-hydrogen tartrates, due to their advantages of being generally easy and cheap to prepare, their high solubility in water, and their capability for growing excellent crystals which are usually colourless and transparent. Non-linear SHG properties can be virtually guaranteed for hydrogen L- or D- tartrates of any organic nitrogenous base having a pKb sufficient for the formation of crystals with the hydrogen tartrate anion.

The SHG activity of many of the hydrogen tartrates is comparable to alpha-silica and potassium dihydrogen phosphate (see Table 1 below) but the hydrogen tartrates have much more desirable chemical and physical properties.

Another class of carboxylic acids which are preferred are benzoic acids substituted by from 1 to 4 groups, preferably from 1 to 3 groups, independently selected from carboxyl (—COOH) and hydroxyl (—OH) groups. These are not chiral acids, but it has been found that they form good quality, colourless, non-hydrated, SHG-active salt crystals with a wide range of organic nitrogenous bases and furthermore they generally exhibit exellent crystal-growing properties with those bases. Hydroxybenzoic acids are especially preferred amongst this class of acids.

The organic base is preferably an amine or an imine. Preferred organic bases are lower alkylamines, arylamines or heterocyclic ring compounds (amines or imines) containing a basic nitrogen atom. The base is most preferably a cyclic compound, with the basic nitrogen atom either forming part of a heterocycle or being outside the ring but directly linked to a carbon atom within the ring. The organic base may be optionally substituted with hydrogen bond-promoting groups, for example hydroxyl or amido groups. Examples of such organic bases include optionally substituted bases selected from piperidine, pyridine, piperazine, benzylamine, imidazole, pyrimidine and phenylethylamine.

One preferred class of organic nitrogenous bases are compounds which possess large secondary molecular susceptibilities and as a result can exhibit SHG responses of large magnitude at certain molecular alignments within a crystal lattice. These compounds, which preferably have secondary molecular susceptibilities (beta-values) greater than $1 \times 10^{-30}$ esu, more preferably greater than $10 \times 10^{-30}$ esu, are exemplified by derivatives of enones, nitroanilines, stilbenes and various heterocycles, and are typically very difficult to grow into non-centrosymmetric, single-crystal form required to produce an SHG response of large magnitude. They also typically suffer from the disavantages of possessing relatively low melting points and high vapour pressures, giving rise to thermal stability and toxicity problems respectively. Those bases with sufficient basicity will react with carboxylic acids to form SHG-responsive salts, especially with chiral acids, which are found to exhibit improved crystal-growing properties, higher melting points and lower vapour pressures. Derivatives, in particular amido derivatives, of nitroanilines containing at least one nitrogen atom capable of accepting a proton are especially preferred, since these compounds readily react with carboxylic acids to form salts. The at least one nitrogen atom is preferably present in a secondary amino substituent group present on the benzene ring of the compound. Examples of these especially preferred bases are 4-(N-piperazino)-3-(N-ethanamido)-nitrobenzene and 4-N-(4-(aminomethyl)-piperidino)-3-(N-ethanamido)nitrobenzene.

Materials suitable for use in the NLO device of the present invention will now be illustrated by way of example only.

EXAMPLE 1

Preparation of pyridinium hydrogen-(L)-tartrate

Pyridine (0.5 g; 6.3 mmol) was added to a solution of (L)-tartaric acid (1.0 g; 6.7 mmol) in water (5 cm$^3$). A mixture of propanol and ethanol (1:1; 5 cm$^3$) was then added, which resulted in the formation of a white solid. The solid was collected by filtration and was washed with propanol (10 cm$^3$). The product was then recrystallised from water and left to dry in air. Yield: 1.20 g, 83%. Found: C, 47.0%; H, 4.8%; N, 6.0%. Calculated for $C_9H_{11}NO_6$: C, 47.16%; H, 4.85%; N, 6.11%. M.pt. 143°–145° C.

EXAMPLE 2

Preparation of piperazium hydrogen-(L)-tartrate

A solution of (L)-tartaric acid (1.0 g; 6.7 mmol) in water (10 cm$^3$) was added to a solution of piperazine (0.58 g; 6.7 mmol) in methanol (10 cm$^3$). The volume was reduced to half by boiling and the product was precipitated with an ethanol-ethanenitrile (1:1; 6 cm$^3$) mixture. The white solid was collected by filtration, washed carefully with cold ethanol (5 cm$^3$), and then dried in air. Yield: 1.27 g, 85%. Found: C, 40.6%; H, 6.6%; N, 11.9%. Calculated for $C_8H_{16}N_2O_6$: C, 40.67%; H, 6.84%; N, 11.86%. M.pt. 250° C.

EXAMPLE 3

Preparation of piperazinium (2+) bis(hydrogen-(L)-tartrate)

A solution of (L)-tartaric acid (1.0 g; 6.7 mmol) in water (10 cm$^3$) was added to a solution of piperazine (0.58 g; 6.7 mmol) in methanol (10 cm$^3$). The volume was reduced by boiling and the product was precipitated with an ethanol-ethanenitrile (1:1; 6 cm$^3$) mixture.

The white solid was collected by filtration and washed with cold ethanol. Slow recrystallisation from water yielded clear, hexagonal crystals.
Yield: 0.89 g; 68%. Found: C, 37.1%; H, 5.6%; N, 7.2%. Calculated for $C_{12}H_{22}N_{12}$; C, 37.31%; H, 5.75%, N, 7.25%. M.pt. 230° C.

EXAMPLE 4

Preparation of benzylammonium hydrogen-(L)-tartrate

Benzylamine (0.68 g; 6.3 mmol) was added dropwise to a solution of (L)-tartaric acid (1.0 g; 6.7 mmol) in water (10 cm$^3$). A white solid was precipitated with a butanol-ethanol (1:1; 5 cm$^3$) mixture. The product was collected by filtration and washed with cold propanal (5 cm$^3$). This solid was finally recrystallised from water and dried in air. Yield: 1.39 g, 86%. Found: C, 51.2%; H, 5.8%; N, 5.3%, Calculated for $C_{11}H_{15}NO_6$: C, 51.35%; H, 5.89%; N, 5.45%. M.pt. 170°–172° C.

EXAMPLE 5

Preparation of 2-aminopyrimidinium hydrogen-(L)-tartrate (L)-Tartaric acid (1.0 g; 6.7 mmol) was dissolved in water (10 cm$^3$) and added slowly to a solution of 2-aminopyrimidine (0.60 g; 6.31 mmol) in water (5 cm$^3$). This mixture was left at 4° C. overnight which resulted in the precipitation of a white solid. The product was collected by filtration and washed with cold propanol (5 cm$^3$). The product was then recrystallized from water and dried in air. Yield: 1.1 g, 71%. Found: C, 39.0%; H, 4.5%; N, 17.3%. Calculated for $C_8H_{11}N_3O_6$: C, 39.18%; H, 4.53%; N, 17.14%. M.pt. 172°–174° C.

EXAMPLE 6

Preparation of (D)-1-phenylethylammonium hydrogen-(L)-tartrate (D)-1-Phenylethylamine (1.0 g; 8.25 mmol) was added slowly to a solution of (L)-tartaric acid (1.2 g; 8.0 mmol) in water (10 cm$^3$) to produce a white solid. The solid was collected by filtration, washed with cold propanol (5 cm$^3$) and dried in air. Yield: 1.69 g, 78%. Found: C, 52.9%; H, 6.1%; N, 5.2%. Calculated for $C_{12}H_{17}NO_6$: C, 53.13%; H, 6.33%; N, 5.16%. M.pt. 193°–195° C.

EXAMPLE 7

Preparation of 3-hydroxypyridinium hydrogen-(L)-tartrate

3-Hydroxypyridine (0.64 g; 6.1 mmol) was dissolved in methanol (10 cm$^3$) and added to a solution of (L)-tartaric acid (1.0 g; 6.7 mmol) in water (5 cm$^3$). A mixture of propanol, ethanol and methanol (1:1:1; 6 cm$^3$) was added which caused precipitation of an off-white solid. The product was collected by filtration and recrystallized from methanol to produce translucent needles. Yield: 1.10 g, 74%. Found: C, 44.1%; H, 4.5%; N, 5.6%. Calculated for $C_9H_{11}NO_7$: C, 44.08%; H, 4.53; N, 5.71%. M.pt. 137°–139° C.

An experimental powder technique for evaluating the nonlinear optical materials of Examples 1 to 7 was developed from the technique of Kurtz and Perry, *J. Appl. Phys.*, 1968, 39, 3798. Kurtz and Perry showed that it was possible to make a classification of the second harmonic generation (SHG) activity of a material using a powdered sample, thereby avoiding the tedious process of having to grow single crystals of the material. Once a promising candidate has been identified using the powder technique, more effort could then be spent on growing single crystals for more extensive measurements. The success of the powder technique of Kurtz and Perry rests on the fact that second harmonic generation is extremely sensitive to noncentrosymmetric structures, which means that even a few small particles give rise to a detectable second harmonic (SH), providing that the output power is sufficiently high. The main disadvantage with powder measurements compared with single crystal measurements is that, since the particles of a powdered sample are randomly oriented, absolute magnitudes of the nonlinear response along certain crystallographic axes cannot be obtained. As no absolute values are available with the powder technique, powder measurements of a material are always made against a powdered standard, e.g. quartz, KDP, urea, $LiNbO_3$, etc.

The powder SHG measurements were made using a pulsed Spectron SL2Q Nd:YAG laser, operating at 1064 nm. The green emission at 532 nm was detected by a Hamamatsu 1P28 photomultiplier, coupled to a Hewlett Packard 174417 100 MHz storage oscilloscope. The oscilloscope monitored the photomultiplier current as the voltage across a 1 MOhm resistance. The photomultiplier was fitted with a telescope such that light was accepted over an angular range of ±5° at a distance of 10 cm from the sample. The normal power output from the laser was kept at 10 mJ±1. The laser beam illuminating the sample had a diameter of 2 mm. A series of filters and dichromic mirrors in the telescope were used to eliminate the 1064 nm radiation transmitted by the sample.

The samples were ground, using either a vibrating ball mill or a mortar and pestle, and then graded using standard sieves. The particle size was checked by standard optical techniques and was found to be 150–180 nm. The graded powders were then mounted in a thin aluminum holder placed between two glass slides. The aluminum holder also functioned as a spacer, ensuring that the sample thickness was consistent for every measurement. The thickness of the samples were 380±40 microns. Great care was taken to ensure that the glass slides were free from dust, as small dust particles may have given rise to spurious signals of visible light overlapping the second harmonic. In order to reduce surface scattering from the dry powders, a refractive index matching liquid (eg. 4-chlorotoluene, dibenzylamine, etc.) was, in most cases, added to each sample.

The mounted sample was finally slotted into a sliding holder which displayed the sample at a 90° angle relative to the incident fundamental beam. The holder was controlled by a stepper motor and could be moved in the x-y directions. The arrangement meant that the sample could easily be irradiated at different parts of the surface.

For the quantitative measurements, an average value was reached by taking three different readings from different parts of the surface of the sample. All the readings were taken in the forward direction, i.e. 0° relative to the incident fundamental beam. To ensure that the detected SH was due to a noncentrosymmetric sample, blank checks were made continously with graded centrosymmetric powders KBr and NaCl, and also with slides and sample holder in the absence of powder. No SH was detected in either of these cases.

TABLE 1

Secondary harmonic generator efficiency of compounds of the present invention as compared with known materials.

| Compound | Efficiency relative to: $SiO_2$ | KDP |
| --- | --- | --- |
| Pyridinium hydrogentartrate | 0.57 | 0.1 |
| Piperazinium hydrogentartrate | 2.85 | 0.5 |
| Piperazium (2+) bis(hydrogentartrate) | 1.57 | 0.275 |
| Benzylammonium hydrogentartrate | 1.77 | 0.31 |
| 2-Aminopyrimidinium hydrogentartrate | 2.00 | 0.35 |
| 1-Phenylethylammonium hydrogentartrate | 1.14 | 0.2 |
| 3-Hydroxy-pyridinium hydrogentartrate | 13.7 | 2.4 |

EXAMPLE 8

Preparation of 2-aminopyrimidinium (S)-lactate (S)-Lactic acid (3.0 g; 28 mmol) was dissolved in methanol (5 cm$^3$) and added to a solution of 2-aminopyrimidine (2.7 g; 28 mmol) in methanol (5 cm$^3$). The resulting white product was collected by filtration, recrystallized from water, and dried in vacuo. Found: C, 58.0%; H, 5.4%; N, 16.8%. Calculated for $C_{12}H_{13}N_3O_3$: C, 58.28%; N, 5.31%; N, 17.00%. M.pt. 125°–127° C.

EXAMPLE 9

Preparation of benzylammonium (S)-mandelate (S)-Mandelic acid (3.0 g; 22 mmol) was dissolved in ethanol (10 cm$^3$) and added to a mixture of benzylamine (2.2 g; 20 mmol) and methanol (5 cm$^3$). The white product was collected by filtration, recrystallized from water and dried in vacuo. Found: C, 69.2%; H, 6.6%; N, 5.4%. Calculated for $C_{14}H_{17}NO_3$: C, 69.47%; H, 6.62%; N, 5.40%. M.pt. 174°–175° C.

EXAMPLE 10

Preparation of benzylammonium (S)-hydroxysuccinate (S)-Hydroxysuccinic acid (3.0 g; 22 mmol) was dissolved in methanol (10 cm$^3$) and added to a mixture of benzylamine (2.2 g; 22 mmol) and ethanol (5 cm$^3$). The resulting white solid was collected by filtration, recrystallized from water and dried in vacuo. Found: C, 54.6%; H, 6.3%; N, 5.8%. Calculated for $C_{11}H_{15}NO_4$: C, 64.76%; H, 6.28%; N, 5.81%. M.pt. 149°–150° C.

EXAMPLE 11

Preparation of piperidinium 4-hydroxybenzoate

Piperidine (0.85 g; 10 mmol) was added dropwise to a solution of 4-hydroxybenzoic acid (1.38 g; 10 mmol) in ethanol (10 cm$^3$). The resulted in the precipitation of a white solid. The product was collected by filtration and recrystallized from water to produce translucent, colourless crystals. Found: C, 64.6%; H, 7.6%; N, 6.2%. Calculated for $C_{12}H_{17}NO_3$; C, 64.55%; H, 7.69%; N, 6.24%. M.pt. 197°–199° C.

EXAMPLE 12

Preparation of piperidinium 3-hydroxybenzoate

Piperidine (0.85 g; 10 mmol) was added dropwise to a solution of 3-hydroxybenzoic acid (1.38 g; 10 mmol) in ethanol (10 cm$^3$). The solution was then left to stand at 5° C. in an open beaker for two weeks. This produced the desired product in the form of white crystals. The product was collected by filtration and recrystallized from water to produce translucent, colourless crystals. Found: C, 63.4%; H, 7.6%; N, 6.2%. Calculated for $C_{12}H_{17}NO_3$; C, 64.55%; H, 7.69%; N, 6.24%. M.pt. 154°–156° C.

EXAMPLE 13

Preparation of piperidinium 2,4-dihydroxybenzoate

Piperidine (0.85 g; 10 mmol) was added dropwise to a solution of 2,4-dihydroxybenzoic acid (1.54 g; 10 mmol) in ethanol (10 cm$^3$). This mixture was then left at 5° C. overnight, which resulted in the precipitation of a white solid. The product was collected by filtration and recrystallized from water to produce needle-like crystals. Found: C, 61.3%; H, 7.3%; N, 5.9%. Calculated for $C_{12}H_{17}NO_4$; C, 60.25%; H, 7.11%; N, 5.85%. M.pt. 210°–211° C.

EXAMPLE 14

Preparation of benzylammonium 4-hydroxybenzoate

Benzylamine (1.07 g; 10 mmol) was added dropwise to a solution of 4-hydroxybenzoic acid (1.38 g; 10 mmol) in methanol (10 cm$^3$). A white solid formed immediately. The product was collected by filtration and recrystallized from water to produce white needle-like crystals. Found: C, 68.6%; H, 6.2%; N, 5.6%. Calculated for $C_{14}H_{15}NO_3$: C, 68.57%; H, 6.12%; N, 5.71%. M.pt. 229°–230° C.

EXAMPLE 15

Preparation of benzylammonium 2,3-dihydroxybenzoate

Benzylamine (1.07 g; 10 mmol) was added dropwise to a solution of 2,3-dihydroxybenzoic acid (1.54 g; 10 mmol) in methanol (10 cm$^3$). An off-white solid formed almost immediately. The product was collected by filtration and recrystallized from water to produce white crystals. Found: C, 62.0%; H, 5.8%; N, 5.1%. Calculated for $C_{14}H_{15}NO_4$; C, 64.30%; H, 5.74%; N, 5.36%. M.pt. 169°–170° C.

EXAMPLE 16

Preparation of benzylammonium 2,6-dihydroxybenzoate

Benzylamine (1.07 g; 10 mmol) was added dropwise to a solution of 2,6-dihydroxybenzoic acid (1.54 g; 10 mmol) in methanol (10 cm$^3$). The mixture was left to stand at 20° C. overnight which resulted in the formation of pale pink crystals. The product was collected by filtration and recrystallized from water to produce white crystals. Found: C, 63.8%; H, 5.9%; N, 5.1%. Calculated for $C_{14}H_{15}NO_4$: C, 64.30%; H, 5.74%; N, 5.36%. M.pt. 182°–184° C.

EXAMPLE 17

Preparation of d-1-phenylethylammonium 4-hydroxybenzoate d-1-Phenylethylamine (1.21 g; 10 mmol) was added dropwise to a solution of 4-hydroxybenzoic acid (1.38 g; 10 mmol) in methanol (10 cm$^3$). This resulted in the immediate precipitation of a white solid.

The product was collected by filtration and recrystallized from water to produce translucent, colourless needle-like crystals. Found: C, 69.6%; H, 6.7%; N, 5.3%. Calculated for $C_{15}H_{17}NO_3$: C, 69.49%; H, 6.56%; N, 5.40%. M.pt. 208°–210° C.

EXAMPLE 18

Preparation of d-1-phenylethylammonium 3-hydroxybenzoate d-1-Phenylethylamine (1.21 g; 10 mmol) was added dropwise to a solution of 3-hydroxybenzoic acid (1.38 g; 10 mmol) in methanol (10 cm$^3$). The mixture was left overnight at 5° C. which produced white needle-like crystals. The product was collected by filtration and recrystallized from water to produce translucent, colourless needle-like crystals. Found: C, 69.5%; H, 6.7%; N, 5.4%. Calculated for C$_{15}$H$_{17}$NO$_3$: C, 69.49%, H, 6.56%, N, 5.40%. M.pt. 173°–175° C.

EXAMPLE 19

Preparation of d-1-phenylethylammonium 2,6-hydroxybenzoate d-1-Phenylethylamine (1.21 g; 10 mmol) was added dropwise to a solution of 2,6-hydroxybenzoic acid (1.56 g; 10 mmol) in methanol (10 cm$^3$). The mixture was left overnight at 5° C. which produced pink crystals. The product was collected by filtration and recrystallized from water to produce colourless crystals. Found: C, 64.4%; H, 6.2%; N, 5.0%. Calculated of C$_{15}$H$_{17}$NO$_4$: C, 64.45%, H, 6.18%, N, 5.09. M.pt. 188°–190° C.

EXAMPLE 20

Preparation of AMPHEN hydrogen-(L)-tartrate, the hydrogen-(L)-tartrate salt of monoprotonated 4-N-(4-(aminomethyl)piperidino)-3-(N-ethanamido)nitrobenzene A solution of 2-fluoro-5-nitro ethaneanilide (10 g; 50 mmol) in nitromethane (100 cm$^3$) was added dropwise for 20–30 minutes to a mixture of 4-(aminomethyl) piperidne (6.9 g; 60 mmol) and sodium bicarbonate (4.2 g; 50 mmol) in nitromethane (50 cm$^3$). The latter mixture was heated under reflux for ten minutes prior to the addition of the 2-fluoro-5-nitro ethaneanilide solution.

The resulting solution was heated under reflux for a further 45 minutes and then left to cool to 20° C. The reaction vessel was left at this temperature for 24 hours which caused the precipitation of NaF and unreacted sodium bicarbonate. Following careful decanting of the yellow liquid, the solvent was removed by evaporation which resulted in the precipitation of a yellow solid. The crude product was then recrystallized in a minimum volume of methanol to yield a bright yellow solid hereinafter referred to as "AMPEN". Yield: 10.7 g; 73%. Calculated for C$_{14}$H$_{20}$N$_4$O$_3$: C, 57.3%; H, 7.2%; N, 19.1. Found: C, 55.6%; H, 6.9%; N, 18.9%. M.pt. 126°–128° C.

L-Tartaric acid (0.25 g; 1.6 mmol) was dissolved in a methanol/butanol mixture (1.5 cm$^3$/1.5 cm$^3$) and added to a methanolic solution of AMPEN (16 cm$^3$; 0.1M). This resulted in the appearance of a slightly viscous, orange-yellow, product. The product was collected by filtration and washed with di-ethyl ether which solidified the product. The solid was then dried in vacuo for two weeks. M.pt. 175°–178° C.

EXAMPLE 21

Preparation of PENH hydrogen-(L)-tartrate, the hydrogen-(L)-tartrate salt of monoprotonated 4-(N-piperazino)-3-(N-ethanamido)nitrobenzene A solution of 2-fluoro-5-nitro ethaneanilide (1.0 g; 5 mmol) in ethanenitrile (50 cm$^3$) was added slowly, but continuously, to a solution of piperazine (0.45 g; 5 mmol) in ethanenitrile (20 cm$^3$), heated under reflux. The yellow mixture was then heated for a further 15 minutes. This induced a colour change from yellow to golden yellow. The reaction mixture was then allowed to cool to 20° C. Upon cooling, the mixture became cloudy. Water (25 cm$^3$) was then added which caused the precipitation of a yellow solid. The product, hereinafter referred to as "PEN", was collected by filtration and dried in vacuo. Yield: 0.85 g; 63%. Calculated for C$_{12}$H$_{17}$N$_4$O$_3$: C, 54.5%; H, 6.1%; N, 21.2%. Found: C, 53.6%; H, 5.6%; N, 21.0%. M.pt. 148°–149° C.

L-Tartaric acid (0.06 g; 0.4 mmol) was dissolved in a mixture of ethanenitrile (5 cm$^3$) and methanol (10 cm$^3$) and was added to a standard solution of PEN (20 cm$^3$; 0.02M) made up by dissolving PEN (1.36 g) in a mixture of methanol (100 cm$^3$) and ethanenitrile (150 cm$^3$). This resulted in the precipitation of light ochre, slightly waxy product. The product was collected by filtration and washed with di-ethyl ether (1 cm$^3$) which solidified the product. The solid was then dried in vacuo for two weeks. M.pt. 180°–183° C.

EXAMPLE 22

Preparation of PENH 4-hydroxybenzoate, the 4-hydroxybenzoate salt of monoprotonated 4-(N-piperazino)-3-(N-ethanamido)nitrobenzene 4-Hydroxy benzoic acid (0.056 g; 0.4 mmol) was dissolved in a mixture of ethanenitrile (5 cm$^3$) and methanol (10 cm$^3$) and was added to a standard solution of PEN (20 cm$^3$; 0.02M) prepared by the method described above under Example 21. This resulted in the precipitation of pale yellow, slightly waxy product. The product was collected by filtration and washed with di-ethyl ether (1 cm$^3$) which solidified the product. The solid was then dried in vacuo for two weeks. M.pt. 201°–203° C.

The materials of Examples 8 to 22 were screened for their SHG activity by the following technique. Powdered samples of material were prepared and mounted on slides in front of a 1064 nm output, pulsed Nd:Yag laser by the method described above. The laser beam was focused on the slide through a neutral density filter followed by a 30 mm focal length convex lens. SHG activity was assessed by viewing the intensity of the scattered light from the sample through protective goggles which stopped the 1064 nm fundamental frequency but passed 532 nm frequency (green) radiation. The SHG activity of each sample was compared with that of an ungraded powder sample of urea, a material which is known to possess an SHG activity several orders of magnitude greater than KDP but which has very poor crystal growth chracteristics and poor thermal stability. The results of this comparative assessment are given in Table 2 below.

TABLE 2

| Example | SHG Activity |
| --- | --- |
| 8 | Poor |
| 9 | Fair |
| 10 | Poor |
| 11 | Good |
| 12 | Fair |
| 13 | Good |
| 14 | Poor |
| 15 | Fair |
| 16 | Poor |
| 17 | Good |
| 18 | Fair |
| 19 | Poor |

TABLE 2-continued

| Example | SHG Activity |
| --- | --- |
| 20 | Very Good |
| 21 | Fair/Good |
| 22 | Fair/Good |

KEY TO TABLE 2

Comparative SHG Activity

Poor: Where, by moving the sample closer to the focal point of the lens, a weak green signal is discernable.

Fair: Where green light is immediately and clearly observed. The amount of green light seen increases is moved closer to the focal point of the lens.

Good: The intensity of green light emitted by the sample appears to be almost as high as that emitted by the urea sample.

Very Good: The intensity of green light emitted by the sample is significantly higher than that emitted by the urea sample.

The crystal-growing properties of all of the materials described in the Examples were generally exellent and were typically as good as those exhibited by L-argininium dihydrogen phosphate and better than those exhibited by KDP. Since all except those of Examples 20–22 were colourless, they also exhibited negligible optical density and so would not suffer from thermal damage caused by absorption of visible laser energy.

BRIEF DESCRIPTION OF THE DRAWING

An embodiment of the present invention will now be described with reference to the accompanying FIG. 1, which is a schematic representation of of an NLO device mounted in the optical path of a laser.

The device 1 consists of a crystal of an SHG-active salt material 2 according to any one of the preceding Examples mounted within a housing 3 in the optical path 4 of an infra-red laser 5. Infra-red laser energy at wavelength L is received from the laser 5 through an inlet port 6 in the housing 3 and is transmitted from the device 1 at wavelength 0.5 L through an outlet port 7.

Figure 1:
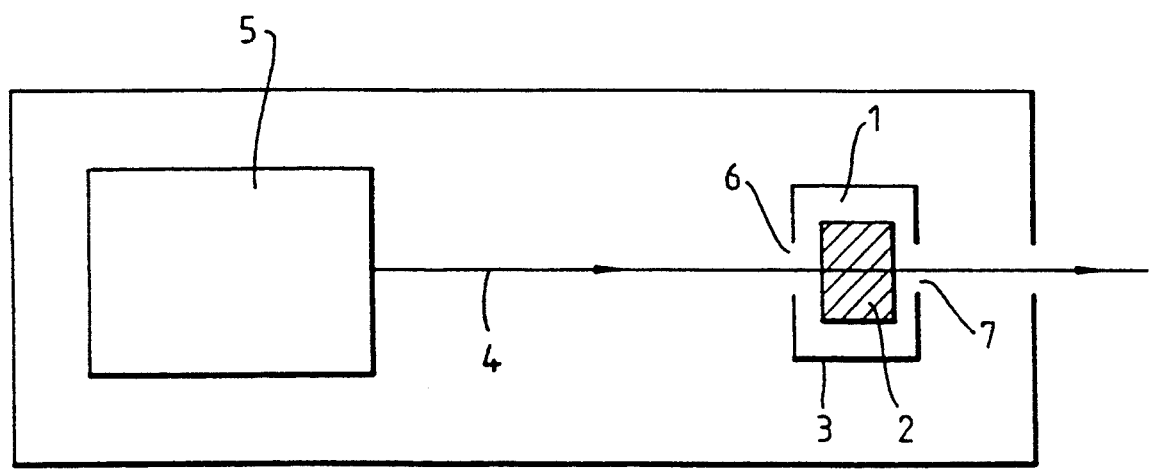

We claim:

1. NLO device comprising a crystalline SHG material mounted in the optical path of a laser, wherein the crystalline material comprises a salt of an organic nitrogenous base and an optically active enantiomer of a chiral carboxylic acid, said acid containing, in addition to its carboxyl (—COOH) group, at least one substituent group selected from —COOH and —OH, said crystalline salt having a non-centrosymmetric crystal structure.

2. NLO device according to claim 1 wherein the acid contains, in addition to its carboxyl (—COOH) group, from 1 to 4 substituent groups independently selected from —OH and —COOH.

3. NLO device according to claim 1 wherein the acid is selected from L-and D-enantiomers of tartaric acid.

4. NLO device according to claim 2 wherein the acid is a substituted benzoic acid.

5. NLO device according to claim 4 wherein the acid is a hydroxybenzoic acid.

6. NLO device according to claim 1 wherein the molecular weight of the acid is less than 100x where x is the total number of —COOH and —OH groups present in the acid molecule.

7. NLO device according to claim 1 wherein the base is an imine or an amine.

8. NLO device according to claim 7 wherein the base is selected from the group consisting of alkylamines, arylamines, and heterocyclic compounds containing a basic nitrogen atom.

9. NLO device according to claim 1 wherein the base is a compound having a secondary molecular susceptibility (beta value) of greater than $1 \times 10^{-30}$ esu.

10. NLO device according to claim 9 wherein the base is a derivative of a nitroaniline.

* * * * *